United States Patent
Numata et al.

(10) Patent No.: US 11,073,652 B2
(45) Date of Patent: Jul. 27, 2021

(54) DISPLAY DEVICE

(71) Applicant: Japan Display Inc., Tokyo (JP)

(72) Inventors: Yudai Numata, Tokyo (JP); Kentaro Okuyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/147,529

(22) Filed: Jan. 13, 2021

(65) Prior Publication Data
US 2021/0132279 A1  May 6, 2021

Related U.S. Application Data

(63) Continuation of application No. PCT/JP2019/027823, filed on Jul. 12, 2019.

(30) Foreign Application Priority Data

Jul. 24, 2018  (JP) .............................. JP2018-138604

(51) Int. Cl.
  *F21V 8/00* (2006.01)
  *G02F 1/1339* (2006.01)
  *G02F 1/1334* (2006.01)

(52) U.S. Cl.
  CPC ........... *G02B 6/005* (2013.01); *G02B 6/0091* (2013.01); *G02F 1/1339* (2013.01); *G02F 1/13347* (2021.01)

(58) Field of Classification Search
  CPC .................................................... G02B 6/005
  See application file for complete search history.

(56) References Cited

U.S. PATENT DOCUMENTS

| | | |
|---|---|---|
| 2005/0117088 A1 | 6/2005 | Van Der Wel |
| 2010/0085510 A1 | 4/2010 | Okuyama et al. |
| 2016/0070047 A1* | 3/2016 | Okuyama ......... G02F 1/133617 349/71 |

(Continued)

FOREIGN PATENT DOCUMENTS

| | | |
|---|---|---|
| JP | 08-031217 A | 2/1996 |
| JP | 2005-516239 A | 6/2005 |

(Continued)

OTHER PUBLICATIONS

International Search Report dated Aug. 20, 2019 in PCT/JP2019/027823 filed on Jul. 12, 2019, citing documents AC & AQ-AT therein, 2 pages.

*Primary Examiner* — Edmond C Lau
(74) *Attorney, Agent, or Firm* — Oblon, McClelland, Maier & Neustadt, L.L.P.

(57) ABSTRACT

According to one embodiment, a display device includes a first transparent substrate, a second transparent substrate, a liquid crystal layer, light-emitting elements disposed in a first direction, a third transparent substrate including a main surface and a side surface opposed to the light-emitting elements, and a transparent layer disposed on the main surface and having a lower refractive index than the third transparent substrate. The third transparent substrate is bonded to the first transparent substrate or the second transparent substrate with the transparent layer sandwiched in between. The transparent layer includes strip portions disposed in the first direction and extended along a second direction.

20 Claims, 14 Drawing Sheets

(56) References Cited

U.S. PATENT DOCUMENTS

2017/0160592 A1* 6/2017 Okuyama ......... G02F 1/133615

FOREIGN PATENT DOCUMENTS

| JP | 2010-092682 A | 4/2010 |
| JP | 2015-103632 A | 6/2015 |
| JP | 2016-057338 A | 4/2016 |
| WO | WO 2012/020669 A1 | 2/2012 |

* cited by examiner

F.I.G. 2

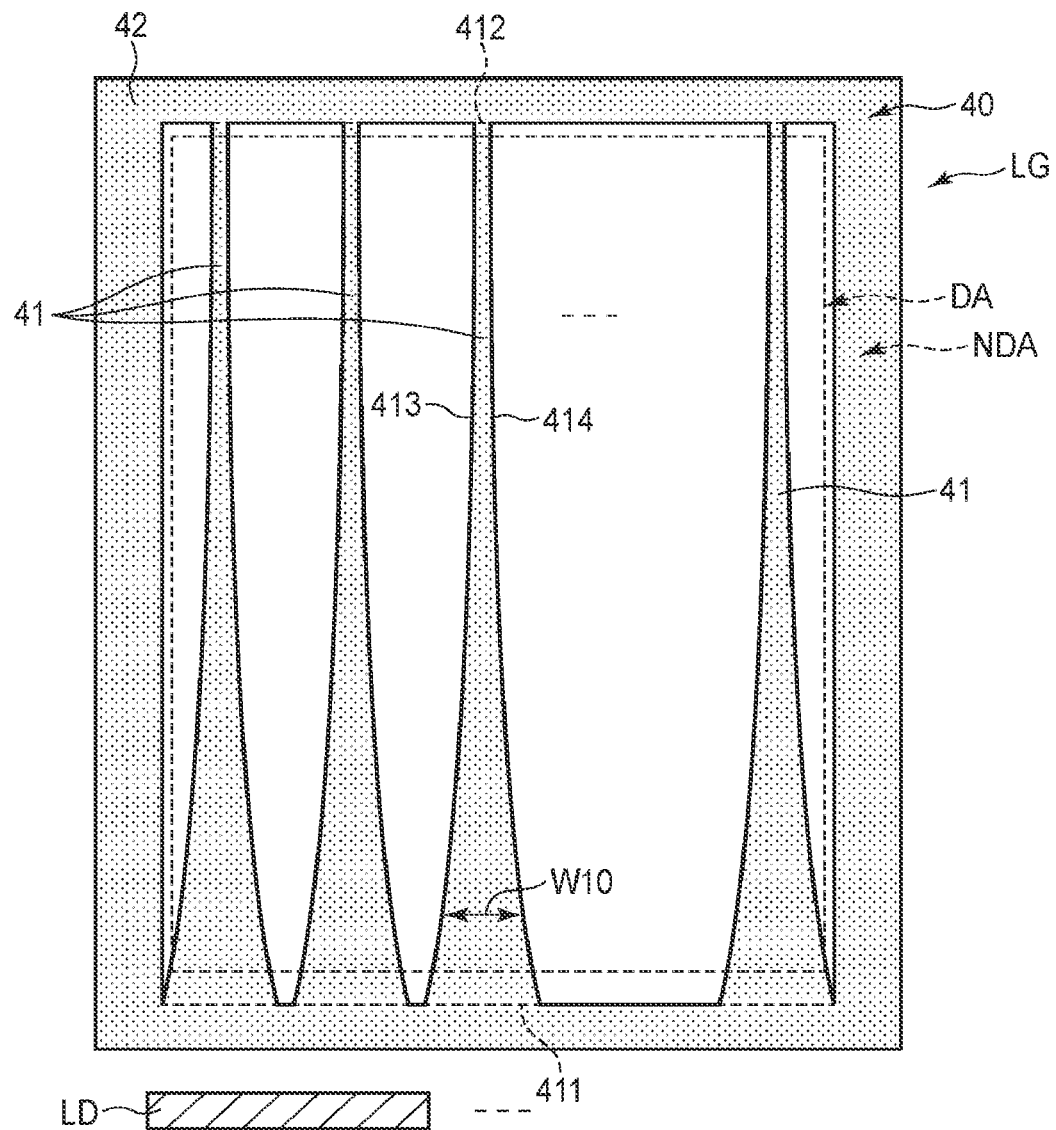
F I G. 9

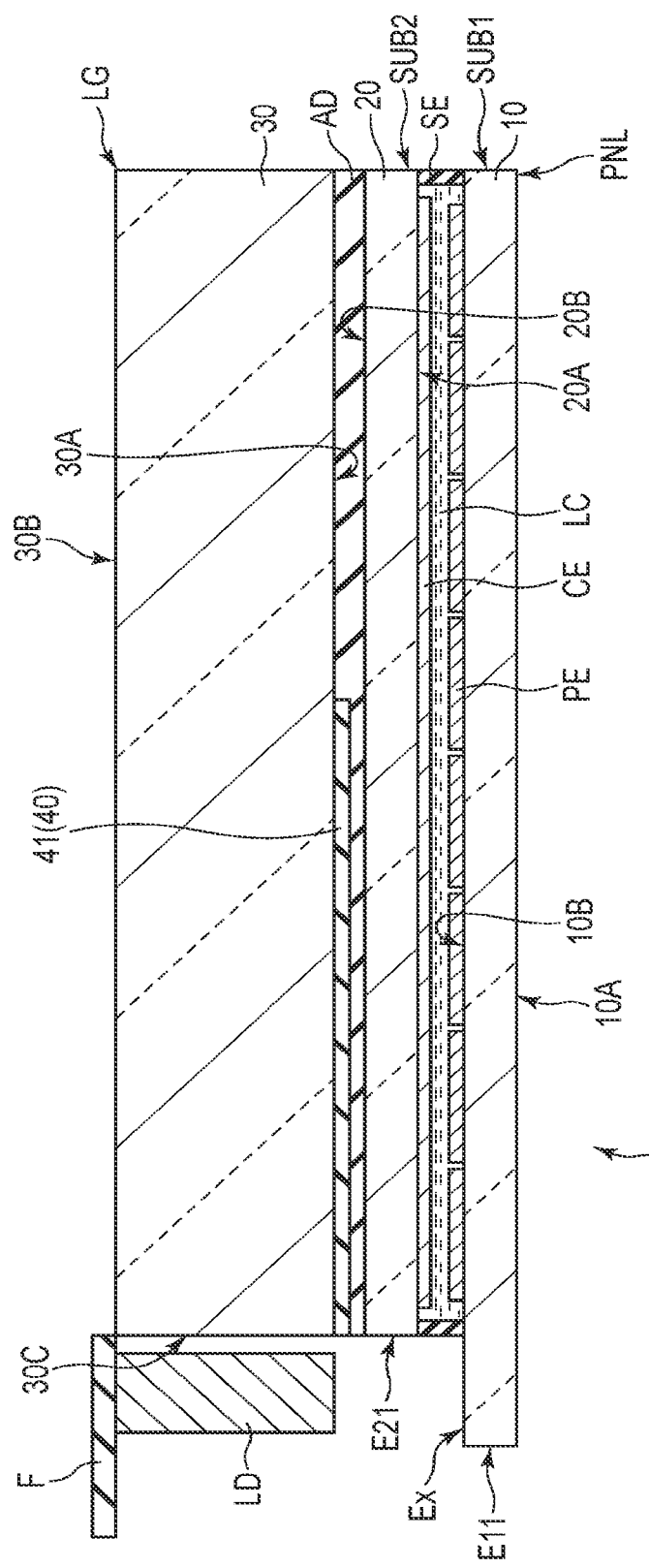
F I G. 15

DISPLAY DEVICE

CROSS-REFERENCE TO RELATED APPLICATIONS

This application is a Continuation Application of PCT Application No. PCT/JP2019/027823, filed Jul. 12, 2019 and based upon and claiming the benefit of priority from Japanese Patent Application No. 2018-138604, filed Jul. 24, 2018, the entire contents of all of which are incorporated herein by reference.

FIELD

Embodiments described herein relate generally to a display device.

BACKGROUND

Recently, various forms of display device have been proposed. An illumination device including a light modulation layer containing a bulk and fine particles having optical anisotropy in a light modulation element bonded to a light guide plate is disclosed. In another example, a light source device including a light conversion portion which contains a polymer dispersed liquid crystal layer and converts an incident light intensity is disclosed.

BRIEF DESCRIPTION OF THE DRAWINGS

FIG. 9 is a plan view showing another configuration example of the light-guiding element LG shown in FIG. 3.

FIG. 15 is a cross-sectional view showing another configuration example of the display device DSP of the present embodiment.

DETAILED DESCRIPTION

Figure 1:
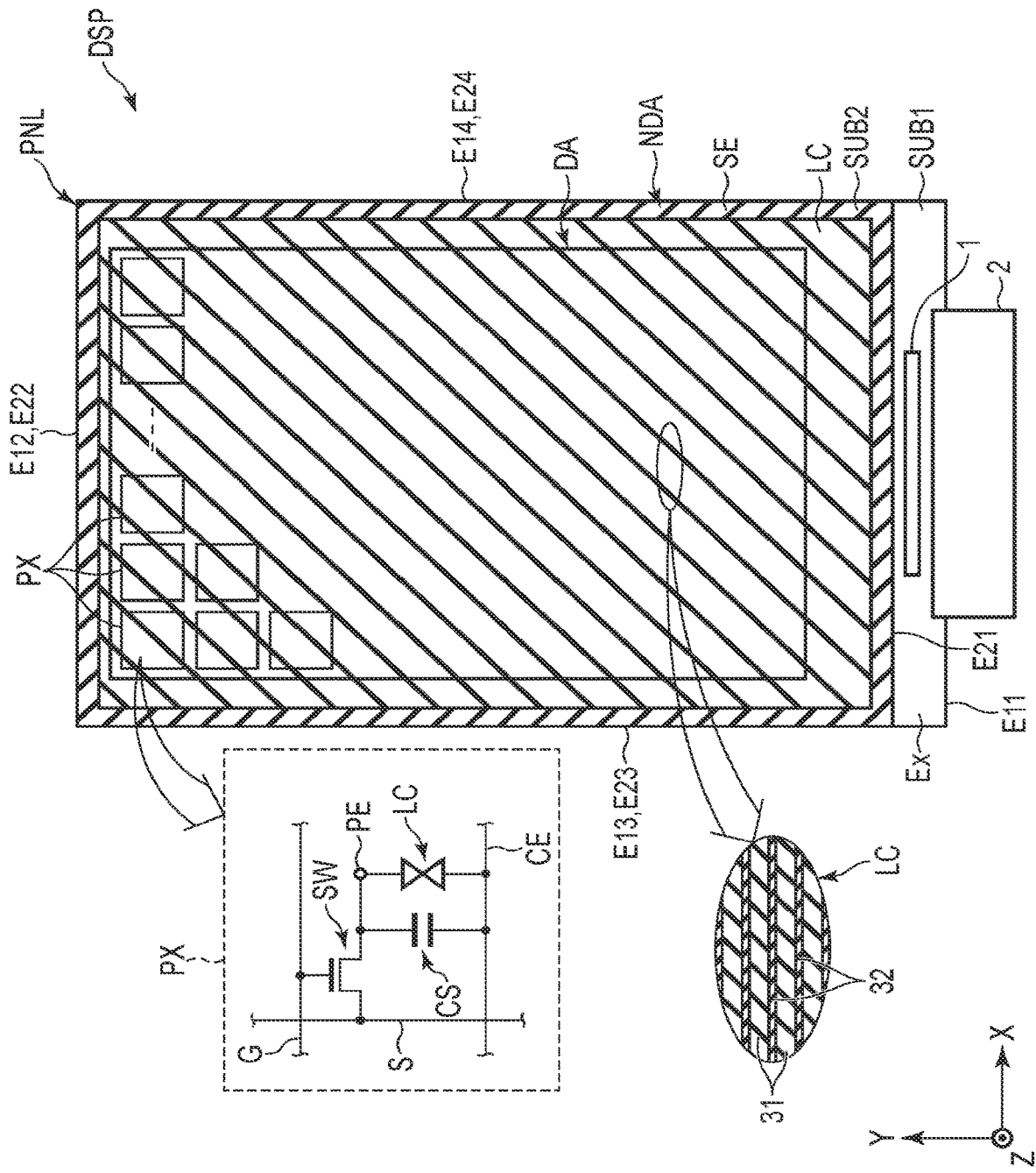
FIG. 1 is a plan view showing one configuration example of a display device DSP of the present embodiment.

According to the present embodiment, there is provided a display device including: a first substrate including a first transparent substrate, a scanning line, a signal line crossing the scanning line, a switching element electrically connected to the scanning line and the signal line, and a pixel electrode electrically connected to the switching element; a second substrate including a second transparent substrate, and a common electrode opposed to the pixel electrode; a liquid crystal layer held between the first substrate and the second substrate and containing a stripe-shaped polymer and liquid crystal molecules; a plurality of light-emitting elements disposed in a first direction; a third transparent substrate including a main surface, and a side surface opposed to the light-emitting elements; and a transparent layer disposed on the main surface and having a lower refractive index than the third transparent substrate. The third transparent substrate is bonded to the first transparent substrate or the second transparent substrate with the transparent layer sandwiched in between. The transparent layer includes a plurality of strip portions disposed in the first direction. The strip portions extend along a second direction orthogonal to the first direction.

According to the present embodiment, there is provided a display device including: a first transparent substrate including a first main surface and a second main surface on an opposite side to the first main surface; a second transparent substrate including a third main surface opposed to the second main surface; a liquid crystal layer located between the second main surface and the third main surface and contains a stripe-shaped polymer and liquid crystal molecules; a plurality of light-emitting elements disposed in a first direction; a third transparent substrate including a fourth main surface opposed to the first main surface, and a side surface opposed to the light-emitting elements; a transparent adhesive layer which bonds the first transparent substrate and the third transparent substrate together; and a transparent layer located between the first main surface and the fourth main surface and having a lower refractive index than the third transparent substrate. The transparent layer includes a plurality of strip portions disposed at intervals in the first direction.

The present embodiment will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference numbers, and detailed explanations of them that are considered redundant are appropriately omitted.

FIG. 1 is a plan view showing one configuration example of a display device DSP of the present embodiment. A first direction X, a second direction Y and a third direction Z are orthogonal to one another in one example but may cross one another at an angle other than 90 degrees. The first direction X and the second direction Y correspond to directions parallel to the main surface of a substrate constituting the display device DSP, and the third direction Z corresponds to the thickness direction of the display device DSP. In the present specification, a direction from a first substrate SUB1 toward a second substrate SUB2 is referred to as an upper side (or simply above), and a direction from the second substrate SUB2 toward the first substrate SUB1 is referred to as a lower side (or simply below). When described as "the second member above the first member" and "the second member below the first member", the second member may be in contact with the first member or apart from the first member. Furthermore, an observation position where the display device DSP is observed is assumed to be located on a pointing end side of an arrow indicating the third direction Z, and viewing toward an X-Y plane defined by the first direction X and the second direction Y from this observation position is referred to as planar view.

In the present embodiment, a liquid crystal display device employing a polymer dispersed liquid crystal will be explained as an example of the display device DSP. The display device DSP includes a display panel PNL, an IC chip 1 and a wiring board 2.

The display panel PNL includes a first substrate SUB1, a second substrate SUB2, a liquid crystal layer LC and a sealant SE. The first substrate SUB1 and the second substrate SUB2 are formed in a flat plate shape parallel to the X-Y plane. The first substrate SUB1 and the second substrate SUB2 overlap in planar view. The first substrate SUB1 and the second substrate SUB2 are bonded together by the sealant SE. The liquid crystal layer LC is held between the first substrate SUB1 and the second substrate SUB2 and is sealed by the sealant SE. In FIG. 1, the liquid crystal layer LC and the sealant SE are indicated by different hatch lines.

As enlarged and schematically shown in FIG. 1, the liquid crystal layer LC includes a polymer dispersed liquid crystal containing a polymer 31 and liquid crystal molecules 32. In one example, the polymer 31 is a liquid crystal polymer. The polymer 31 is formed in a stripe shape extending along the first direction X. The liquid crystal molecules 32 are dispersed in gaps of the polymer 31, and are aligned such that their major axes extend along the first direction X. The polymer 31 and the liquid crystal molecule 32 each have optical anisotropy or refractive anisotropy. The responsiveness to an electric field of the polymer 31 is less than the responsiveness to an electric field of the liquid crystal molecule 32.

In one example, the alignment direction of the polymer 31 hardly changes regardless of the presence or absence of an electric field. On the other hand, the alignment direction of the liquid crystal molecule 32 changes in accordance with an electric field in a state where a high voltage of greater than or equal to a threshold value is applied to the liquid crystal layer LC. In a state where voltage is not applied to the liquid crystal layer LC, the optical axis of the polymer 31 and the optical axis of the liquid crystal molecule 32 are parallel to each other, and light entering the liquid crystal layer LC is transmitted almost without being scattered in the liquid crystal layer LC (transparent state). In a state where voltage is applied to the liquid crystal layer LC, the optical axis of the polymer 31 and the optical axis of the liquid crystal molecule 32 cross each other, and light entering the liquid crystal layer LC is scattered in the liquid crystal layer LC (scattering state).

The display panel PNL includes a display portion DA which displays an image and a frame-shaped non-display portion NDA which surrounds the display portion DA. The sealant SE is located in the non-display portion NDA. The display portion DA includes pixels PX arrayed in a matrix in the first direction X and the second direction Y.

As shown enlarged in FIG. 1, each pixel PX includes a switching element SW, a pixel electrode PE, a common electrode CE, the liquid crystal layer LC and the like. The switching element SW is composed of, for example, a thin-film transistor (TFT) and is electrically connected to a scanning line G and a signal line S. The scanning line G is electrically connected to the switching elements SW in the respective pixels PX disposed in the first direction X. The signal line S is electrically connected to the switching elements SW of the respective pixels PX disposed in the second direction Y. The pixel electrode PE is electrically connected to the switching element SW. Each pixel electrode PE is opposed to the common electrode CE and drives the liquid crystal layer LC (in particular, the liquid crystal molecules 32) by an electric field generated between the pixel electrode PE and the common electrode CE. A capacitance CS is formed, for example, between an electrode having the same potential as the common electrode CE and an electrode having the same potential as the pixel electrode PE.

The first substrate SUB1 has edge portions E11 and E11 which extend along the first direction X and edge portions E13 and E14 which extend along the second direction Y. The second substrate SUB2 has edge portions E21 and E22 which extend along the first direction X and edge portions E23 and E24 which extend along the second direction Y. In the example shown in FIG. 1, the edge portions E12 and E22, the edge portions E13 and E23, and the edge portions E14 and E24 overlap, respectively, in planar view. However, these edge portions may not overlap. The edge portion E21 is located between the edge portion E11 and the display portion DA in planar view. The first substrate SUB1 has an extension portion Ex between the edge portion E11 and the edge portion E21.

The IC chip 1 and the wiring board 2 are each connected to the extension portion Ex. The IC chip 1 has, for example, a built-in display driver which outputs a signal necessary for image display, and the like. The wiring board 2 is a bendable flexible printed circuit board. Note that the IC chip 1 may be connected to the wiring board 2. The IC chip 1 and the wiring board 2 read a signal from the display panel PNL in some cases, but mainly function as a signal source which supplies a signal to the display panel PNL.

Figure 2:
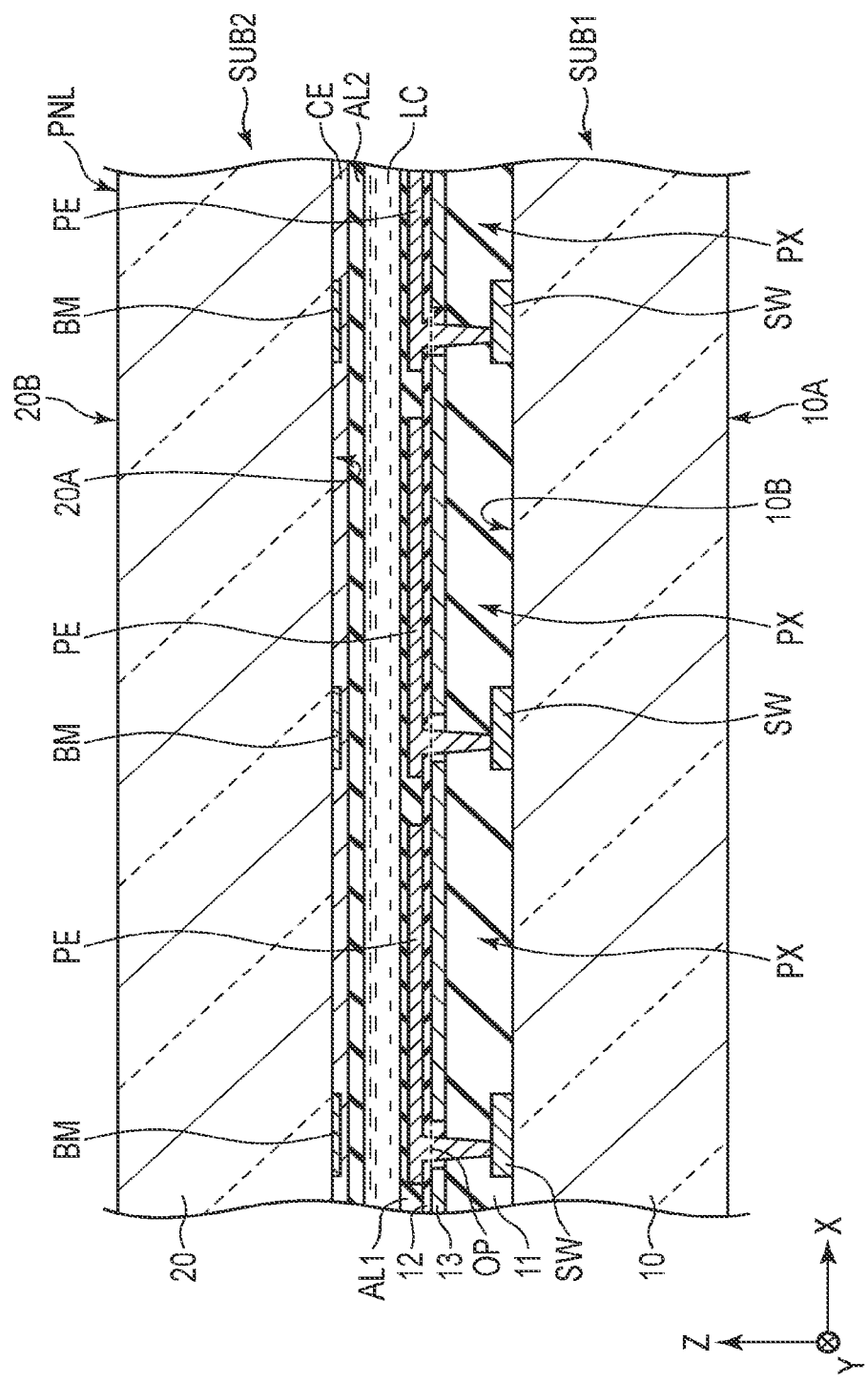
FIG. 2 is a cross-sectional view showing one configuration example of the display panel PNL shown in FIG. 1.

FIG. 2 is a cross-sectional view showing one configuration example of the display panel PNL shown in FIG. 1. The first substrate SUB1 includes a transparent substrate 10, insulating films 11 and 12, a capacitance electrode 13, the switching element SW, the pixel electrode PE and an alignment film AL1. The first substrate SUB1 further includes the scanning line G and the signal line S shown in FIG. 1. The transparent substrate 10 includes a main surface (lower surface) 10A and a main surface (upper surface) 10B on an opposite side to the main surface 10A. The switching element SW is disposed on the main surface 10B. The insulating film 11 covers the switching element SW. The capacitance electrode 13 is located between the insulating films 11 and 12. On the insulating film 12, the pixel electrode PE is disposed for each pixel PX. The pixel electrode PE is electrically connected to the switching element SW via an opening OP of the capacitance electrode 13. The pixel electrode PE overlaps the capacitance electrode 13 across the insulating film 12 and forms the capacitance CS of the pixel PX. The alignment film AL1 covers the pixel electrode PE.

The second substrate SUB2 includes a transparent substrate 20, a light-shielding layer BM, the common electrode CE and an alignment film AL2. The transparent substrate 20 includes a main surface (lower surface) 20A and a main surface (upper surface) 20B on an opposite side to the main surface 20A. The main surface 20A of the transparent substrate 20 faces the main surface 10B of the transparent substrate 10. The light-shielding layer BM and the common electrode CE are disposed on the main surface 20A. The light-shielding layer BM is located, for example, directly above the switching element SW and directly above the scanning line G and the signal line S which are not shown in the drawing. The common electrode CE is disposed over the pixels PX and directly covers the light-shielding layer BM. The common electrode CE is electrically connected to the capacitance electrode 13 and has the same potential as the capacitance electrode 13. The alignment film AL2 covers the common electrode CE. The liquid crystal layer LC is located between the main surface 10B and the main surface 20A and is in contact with the alignment films AL1 and AL2. In the first substrate SUB1, the insulating films 11 and 12, the capacitance electrode 13, the switching element SW, the pixel electrode PE and the alignment film AL1 are located between the main surface 10B and the liquid crystal layer LC. In the second substrate SUB2, the light-shielding layer BM, the common electrode CE and the alignment film AL2 are located between the main surface 20A and the liquid crystal layer LC.

The transparent substrates 10 and 20 are insulating substrates such as glass substrates or plastic substrates. The main surfaces 10A and 10B and the mains surfaces 20A and 20B are surfaces substantially parallel to the X-Y plane. The insulating film 11 is formed of a transparent insulating material such as silicon oxide, silicon nitride, silicon oxynitride or acrylic resin. In one example, the insulating film 11 includes an inorganic insulating film and an organic insulating film. The insulating film 12 is an inorganic insulating film formed of silicon nitride or the like. The capacitance electrode 13, the pixel electrode PE and the common electrode CE are transparent electrodes formed of a transparent conductive material such as indium tin oxide (ITO) or indium zinc oxide (IZO). The light-shielding layer BM is, for example, a conductive layer having a lower resistance than the common electrode CE. In one example, the light-shielding layer BM is formed of a nontransparent metal material such as molybdenum, aluminum, tungsten, titanium or silver. The alignment films AL1 and AL2 are horizontal alignment films having an alignment restriction force substantially parallel to the X-Y plane. In one example, the alignment films AL1 and AL2 are provided with alignment treatment along the first direction X. Note that the alignment treatment may be rubbing treatment or photo-alignment treatment.

Figure 3:
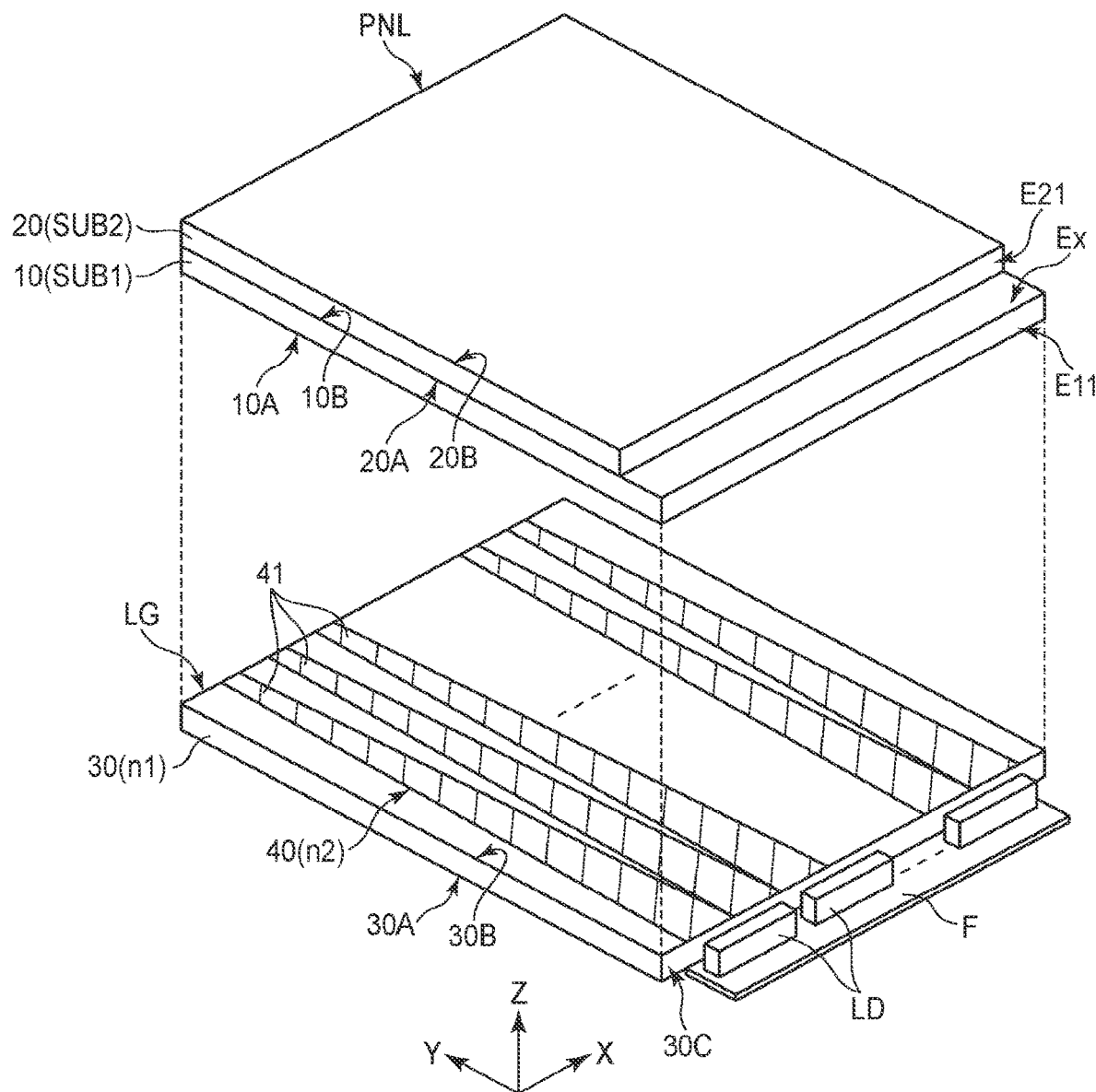
FIG. 3 is an exploded perspective view showing main parts of the display device DSP shown in FIG. 1.

FIG. 3 is an exploded perspective view showing main parts of the display device DSP shown in FIG. 1. The display device DSP includes a light-guiding element LG and a plurality of light-emitting elements LD in addition to the display panel PNL. The light-guiding element LG, the first substrate SUB1 and the second substrate SUB2 are disposed in this order along the third direction Z. The light-emitting elements LD are disposed at intervals in the first direction X. The light-emitting elements LD are connected to a wiring board F. The light-emitting element LD is, for example, a light-emitting diode. Although not described in detail, the light-emitting element LD includes a red light-emitting portion, a green light-emitting portion and a blue light-emitting portion. Light emitted from the light-emitting element LD travels along the direction of an arrow indicating the second direction Y.

The light-guiding element LG includes a transparent substrate 30 and a transparent layer 40.

The transparent substrate 30 is an insulating substrate such as a glass substrate or a plastic substrate and has a refractive index n1. In one example, the transparent substrate 30 is not composed of a plurality of substrates bonded together but is a single substrate. The transparent substrate 30 includes a main surface (lower surface) 30A, a main surface (upper surface) 30B on an opposite side to the main surface 30A, and a side surface 30C. The main surfaces 30A and 30B are surfaces substantially parallel to the X-Y plane. The main surface 30B faces the main surface 10A of the transparent substrate 10. The side surface 30C is a surface substantially parallel to an X-Z plane defined by the first direction X and the third direction Z. The side surface 30C faces the light-emitting elements LD. As will be described later, the transparent substrate 30 is bonded to the transparent substrate 10 with the transparent layer 40 sandwiched in between. The side surface 30C is located directly below the edge portion E11 of the first substrate SUB1 in the example shown in FIG. 3, but may be located directly below the extension portion Ex or more outward than the edge portion E11.

The transparent layer 40 is disposed on the main surface 30B. The transparent layer 40 has a refractive index n2 which is less than the refractive index n1 of the transparent substrate 30. The transparent layer 40 includes a plurality of strip portions 41 disposed at intervals in the first direction X. Each strip portion 41 extends along the second direction Y. The main surface 30B is exposed between the strip portions 41 which are adjacent to each other. The detailed shape of the transparent layer 40 will be described later.

The transparent substrate 30 is formed of, for example, glass, an organic material such as polymethylmethacrylate (PMMA) or polycarbonate (PC). The transparent layer 40 is formed of, for example, an organic material such as siloxane-based resin or fluorine-based resin. The refractive index n1 of the transparent substrate 30 is about 1.5, and the refractive index n2 of the transparent layer 40 is about 1.0 to 1.4. In the example shown in FIG. 3, the main surface 30A of the transparent substrate 30 is in contact with air. However, another transparent layer having an equal refractive index to the transparent layer 40 may be disposed over the entire surface of the main surface 30A.

Figure 4:
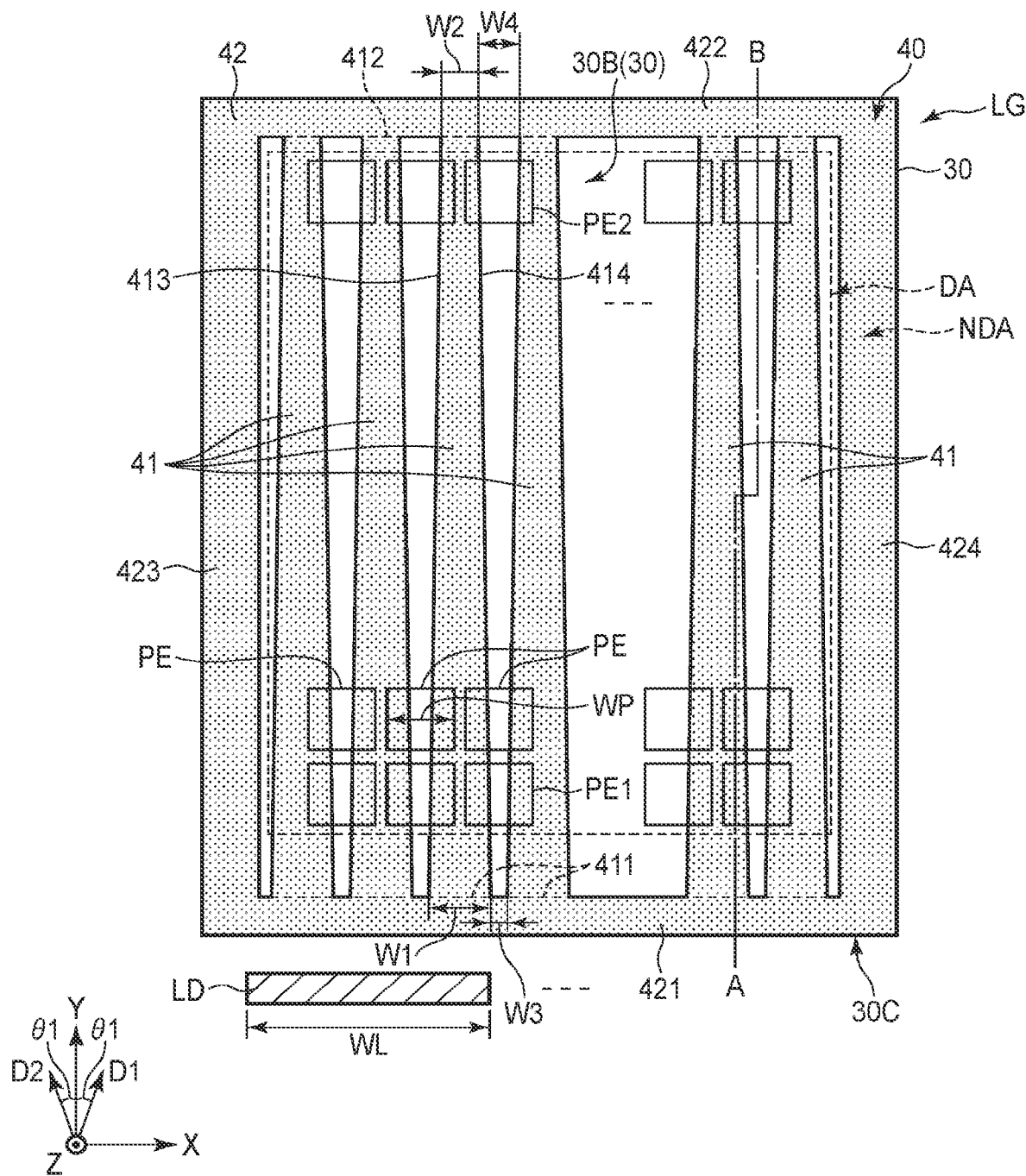
FIG. 4 is a plan view showing one configuration example of a light-guiding element LG shown in FIG. 3.

FIG. 4 is a plan view showing one configuration example of the light-guiding element LG shown in FIG. 3. The transparent layer 40 includes the strip portions 41 and a frame portion 42 surrounding the strip portions 41. The strip portions 41 and the frame portion 42 are integrally formed.

The strip portion 41 includes a first end portion 411 on a side opposed to the light-emitting element LD, a second end portion 412 on an opposite side to the first end portion 411, a first edge 413, and a second edge 414. The first end portion 411 and the second end portion 412 have a first width W1 and a second width W2, respectively. Note that a width in the specification corresponds to a length along the first direction X. The first width W1 is greater than the width W2. In one example, the first width W1 is less than a width WL of one light-emitting element LD, and one light-emitting element LD is disposed over a plurality of strip portions 41 disposed in the first direction X. In addition, the first width W1 is less than or equal to a width WP of one pixel electrode PE (or the pitch of the pixel electrodes PE disposed in the first direction X). The first width W1 may be equal to the second width W2 in the strip portion 41, and the strip portion 41 may be formed with a uniform width.

The first edge 413 and the second edge 414 extend in different directions from the first direction X and the second direction Y between the first end portion 411 and the second end portion 412. For example, a direction crossing at an acute angle clockwise with respect to the second direction Y is defined as a direction D1, and a direction crossing at an acute angle counterclockwise with respect to the second direction Y is defined as a direction D2. Note that an angle θ1 formed by the second direction Y and the direction D1 and an angle θ2 formed by the second direction Y and the direction D2 are the same. However, this is in no way restrictive, and the angle formed by the second direction Y and the direction D1 and the angle formed by the second direction Y and the direction D2 may be different from each other. The first edge 413 extends along the direction D1, and the second edge 414 extends along the direction D2. Here, the first edge 413 and the second edge 414 both extend straight but may be formed curved. The first width W1 and the second width W2 correspond to the gap between the first edge 413 and the second edge 414. The strip portion 41 of such a shape has a width which gradually decreases at a constant rate or an arbitrary rate from the first end portion 411 to the second end portion 412.

When focusing on two adjacent strip portions 41, the gap between the first end portions 411 and the gap between the second end portions 412 have a third width W3 and a fourth width W4, respectively. The third width W3 is less than the first width W1, the fourth width W4 is less than the second width W2, and the third width W3 is less than the fourth width W4. In one example, the second width W2 is about ⅔ the first width W1, the first width W1 is about 9 times the third width W3, the second width W2 is about 1.5 the fourth width W4, and the fourth width W4 is about 4 times the third width W3. The pitch of the adjacent strip portions 41 should preferably be less than or equal to twice the width WP of the pixel electrode PE (or the pitch of the pixel electrodes PE disposed in the first direction X).

The pixel electrode PE overlaps two adjacent strip portions 41 in planar view. The pixel electrode PE overlaps the main surface 30B of the transparent substrate 30 between the strip portions 41. Attention is paid to a pixel electrode PE1 closest to the light-emitting element LD and a pixel electrode PE2 farthest from the light-emitting element LD in the display portion DA. An area in which the pixel electrode PE1 overlaps the strip portions 41 is greater than an area in which the pixel electrode PE2 overlaps the strip portions 41. In addition, an area in which the pixel electrode PE1 overlaps the main surface 30B is less than an area in which the pixel electrode PE2 overlaps the main surface 30B. As will be described later, a region overlapping the strip portion 41 corresponds to a region in which light from the light-emitting element LD hardly enters, and a region overlapping the main surface 30B corresponds to a region in which light from the light-emitting element LD can enter.

When the display panel PNL shown in FIG. 3 and the light-guiding element LG are superimposed, in planar view, the strip portions 41 overlap the display portion DA, and the frame portion 42 overlaps the non-display portion NDA. The frame portion 42 includes a first portion 421 and a second portion 422 which extend along the first direction X, and a third portion 423 and a fourth portion 424 which extend along the second direction Y. The first portion 421 is located between the light-emitting elements LD and the display portion DA. The first portion 421 is connected to the first end portions 411 of the respective strip portions 41. The second end portions 412 of the respective strip portions 41 are connected to the second portion 422 in the example shown in FIG. 4 but may be apart from the second portion 422. The strip portion 41 does not include an edge parallel to the first direction X in the display portion DA, and only the first edge 413 and the second edge 414 which are inclined with respect to the first direction X and the second direction Y overlap the display portion DA.

Figure 5:
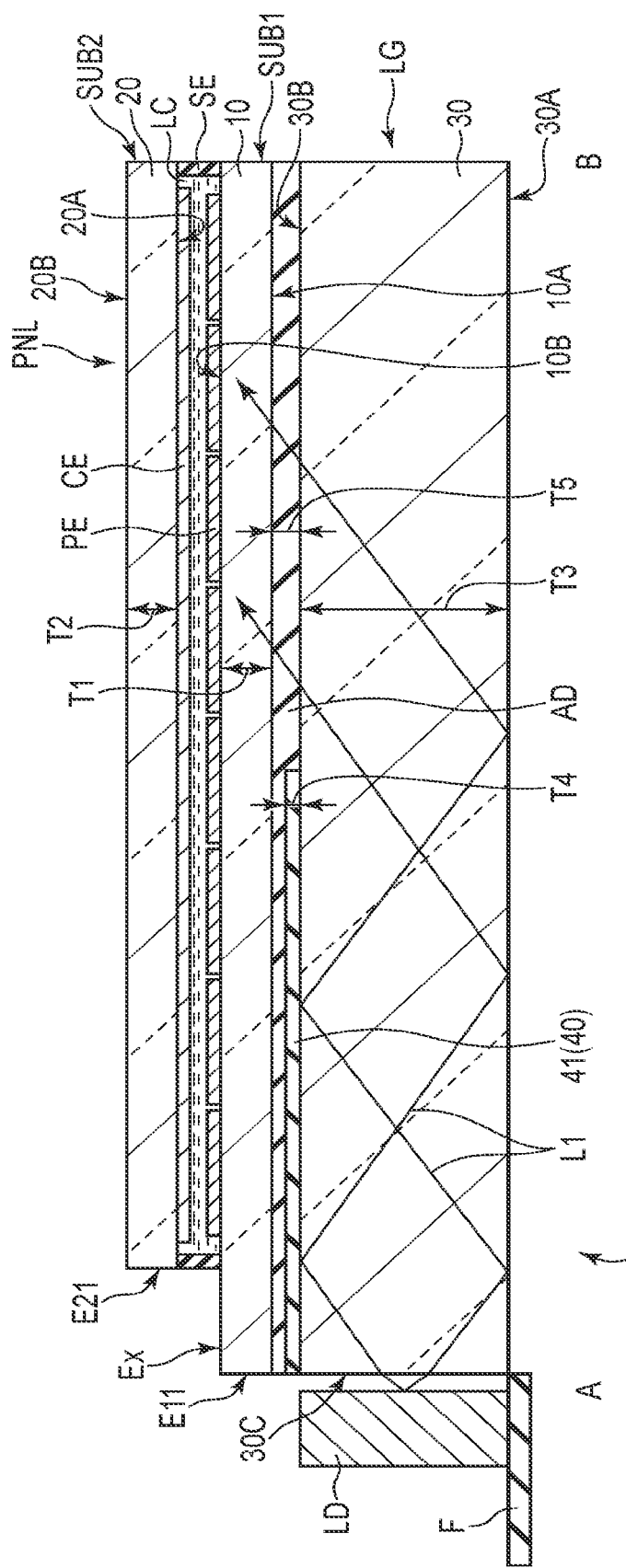
FIG. 5 is a cross-sectional view showing one configuration example of the display device DSP of the present embodiment.

FIG. 5 is a cross-sectional view showing one configuration example of the display device DSP of the present embodiment. Note that, regarding the display panel PNL, only main parts are illustrated. The configuration example shown in FIG. 5 corresponds to an example where the transparent substrate 30 of the light-guiding element LG is bonded to the transparent substrate 10 of the first substrate SUB1 by a transparent adhesive layer AD. The transparent layer 40 including the strip portion 41 is in contact with the main surface 30B. While the transparent adhesive layer AD is in contact with substantially the entire surface of the main surface 10A, the transparent adhesive layer AD covers the transparent layer 40 and is in contact with the main surface 30B in a region in which the transparent layer 40 is missing. The main surface 20B of the transparent substrate 20 is in contact with air, but another transparent substrate similar to the transparent substrate 30 may be bonded to the main surface 20B.

The refractive indexes of the transparent substrates 10 and 20 and the transparent adhesive layer AD are equal to the refractive index n1 of the transparent substrate 30 and are greater than the refractive index n2 of the transparent layer 40. Being "equal" here is not limited to a case where a refractive index difference is zero but includes a case where a refractive index difference is less than or equal to 0.03.

The transparent substrate 10 has a thickness T1, the transparent substrate 20 has a thickness T2, and the transparent substrate 30 has a thickness T3. Note that a thickness in the specification corresponds to a length along the third direction Z. In the illustrated example, the thickness T1 and the thickness T2 are equal, and the thickness T3 is greater than the thicknesses T1 and T2. Note that the thickness T3 may be equal to the thicknesses T1 and T2. In one example, the thickness T3 is 200 μm to 2000 μm. A thickness T4 of the transparent layer 40 will be described later. A thickness T5 of the transparent adhesive layer AD is 4 μm to 4000 μm.

Next, the emitted light from the light-emitting element LD will be explained with reference to FIG. 5.

The light-emitting element LD emits light L1 toward the side surface 30C. Since an air layer is present between the light-emitting element LD and the side surface 30C, the light L1 emitted from the light-emitting element LD is refracted at the side surface 30C and enters the transparent substrate 30. Light traveling toward the transparent layer 40 from the transparent substrate 30 of the light L1 entering the transparent substrate 30 is reflected at the interface between the transparent substrate 30 and the transparent layer 40. In addition, light traveling toward the main surface 30A of the light L1 entering the transparent substrate 30 is reflected at the interface between the transparent substrate 30 and an air layer. As described above, close to the side surface 30C (or in a region in which the transparent layer 40 is present), the light L1 travels inside the transparent substrate 30 while being repeatedly reflected. Light traveling toward a region in which the transparent layer 40 is not present, that is, a region in which the transparent substrate 30 and the transparent adhesive layer AD are in contact with each other of the traveling light L1 is transmitted through the transparent substrate 30 and is transmitted through the transparent substrate 10 via the transparent adhesive layer AD. That is, while the entry to the display panel PNL of the light L1 from the light-emitting element LD is suppressed in a region close to the light-emitting element LD, the entry to the display panel PNL of the light L1 is promoted in a region away from the light-emitting element LD. Note that not all the entry to the display panel PNL of the light L1 is suppressed in the region close to the light-emitting element LD, but the light L1 enters the display panel PNL through the gap between the adjacent strip portions 41 as shown in FIG. 4. The light L1 entering the display panel PNL is transmitted through the pixel in the transparent state and is scattered in the pixel in the scattering state. The display device DSP can be observed from a main surface 30A side and can also be observed from a main surface 40B side. In addition, the display device DSP is a so-called transparent display, and the background of the display device DSP can be observed via the display device DSP regardless of whether the display device DSP is observed from the main surface 30A side or the main surface 40B side.

Meanwhile, the emitted light rays from the light-emitting elements LD disposed at intervals generally travel while spreading, respectively, but close to the light-emitting elements LD, the emitted light rays from the adjacent light-emitting elements LD are not sufficiently mixed together in some cases. Therefore, in the display device DSP using such light as illumination light, when the display portion DA is planarly viewed, stripe-like non-uniformity caused by a luminance difference are visually perceived in the region close to the light-emitting elements LD in some cases. The luminance difference of the illumination light is smaller as the position is farther from the light-emitting elements LD. However, if the distance between the display portion AD and the light-emitting elements LD is increased, the frame width of the display device DSP is increased, accordingly.

According to the present embodiment, in the region in which the transparent layer 40 is present, the light L1 entering from the side surface 30C is guided while being totally reflected inside the transparent substrate 30, and therefore the entry of the light L1 to the display device PNL is suppressed. On the other hand, in the region in which the transparent layer 40 is not present, the entry of the light L1 to the display panel PNL is promoted.

In the display portion DA, the illumination light amount of the light L1 entering the pixel electrode PE1 close to the light-emitting element LD and the illumination light amount of the light L1 entering the pixel electrode PE2 away from the light-emitting element LD are compared. The light L1 from the light-emitting element LD attenuates as it travels away from the light-emitting element LD. The luminance of the light L1 in the region close to the light-emitting element LD is referred to the first luminance, and the luminance of the light L1 in the region away from the light-emitting element LD is referred to as the second luminance. The second luminance is less than the first luminance. The overlapping area of the pixel electrode PE1 and the transparent layer 40 is greater than the overlapping area of the pixel electrode PE2 and the transparent layer 40. Therefore, the area of a region in which the light L1 can enter the pixel electrode PE1 is less than the area of a region in which the light L1 can enter the pixel electrode PE2. On the other hand, the first luminance of the light L1 entering the pixel electrode PE1 is greater than the second luminance of the light L1 entering the pixel electrode PE2. Therefore, the illumination light amounts in the pixel electrode PE1 and the pixel electrodes PE2 can be equalized.

In addition, in the display portion DA, the overlapping area of each of the pixel electrodes PE disposed in the second direction Y and the transparent layer 40 is optimized in accordance with a decrease in the luminance along the second direction Y of the light L1. Therefore, the illumination light amount per pixel electrode PE can be made uniform over substantially the entire region of the display portion DA. Accordingly, degradation of display quality caused by illumination light non-uniformity can be suppressed.

Figure 6:
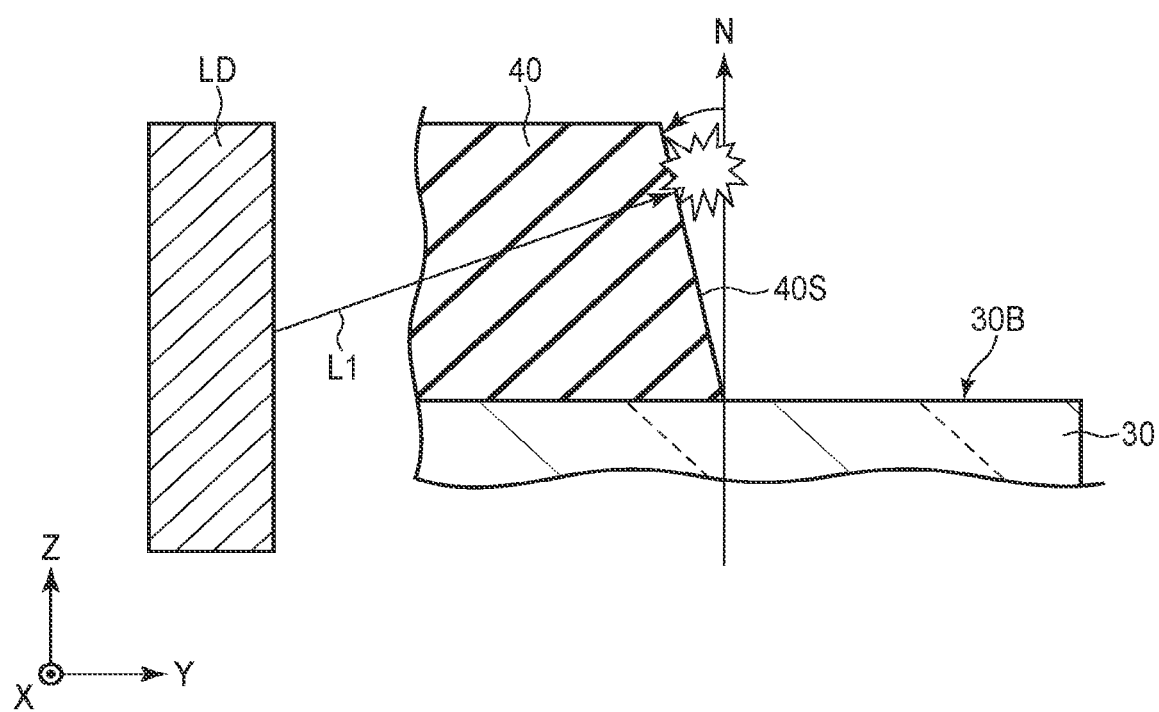
FIG. 6 is a cross-sectional view for explaining undesired scattering at an inclined surface.

FIG. 6 is a cross-sectional view for explaining undesired scattering at an inclined surface. The cross section in the Y-Z plane shown in FIG. 6 corresponds to an example where the transparent layer 40 has an inclined surface 40S extending along the first direction X. The inclined surface 40S is inclined toward the light-emitting element LD with respect to a normal N of the main surface 30B. Alternatively, the inclined surface 40S is a surface crossing at an acute angle counterclockwise with respect to the normal N. In a case where the light L1 from the light-emitting element LD enters the transparent layer 40, undesired scattering occurs at the inclined surface 40S and causes degradation of display quality.

According to the present embodiment, as explained with reference to FIG. 4, the transparent layer 40 does not include an edge extending along the first direction X in the display portion DA and does not include an inclined surface extending along the first direction X. Therefore, undesired scattering in the transparent layer 40 can be suppressed.

In the configuration example shown in FIGS. 1 to 6, the transparent substrate 10 corresponds to the first transparent substrate, the main surface 10A corresponds to the first main surface, the main surface 10B corresponds to the second main surface, the transparent substrate 20 corresponds to the second transparent substrate, the main surface 20A corresponds to the third main surface, the transparent substrate 30 corresponds to the third transparent substrate, and the main surface 30B corresponds to the fourth main surface.

Figure 7:
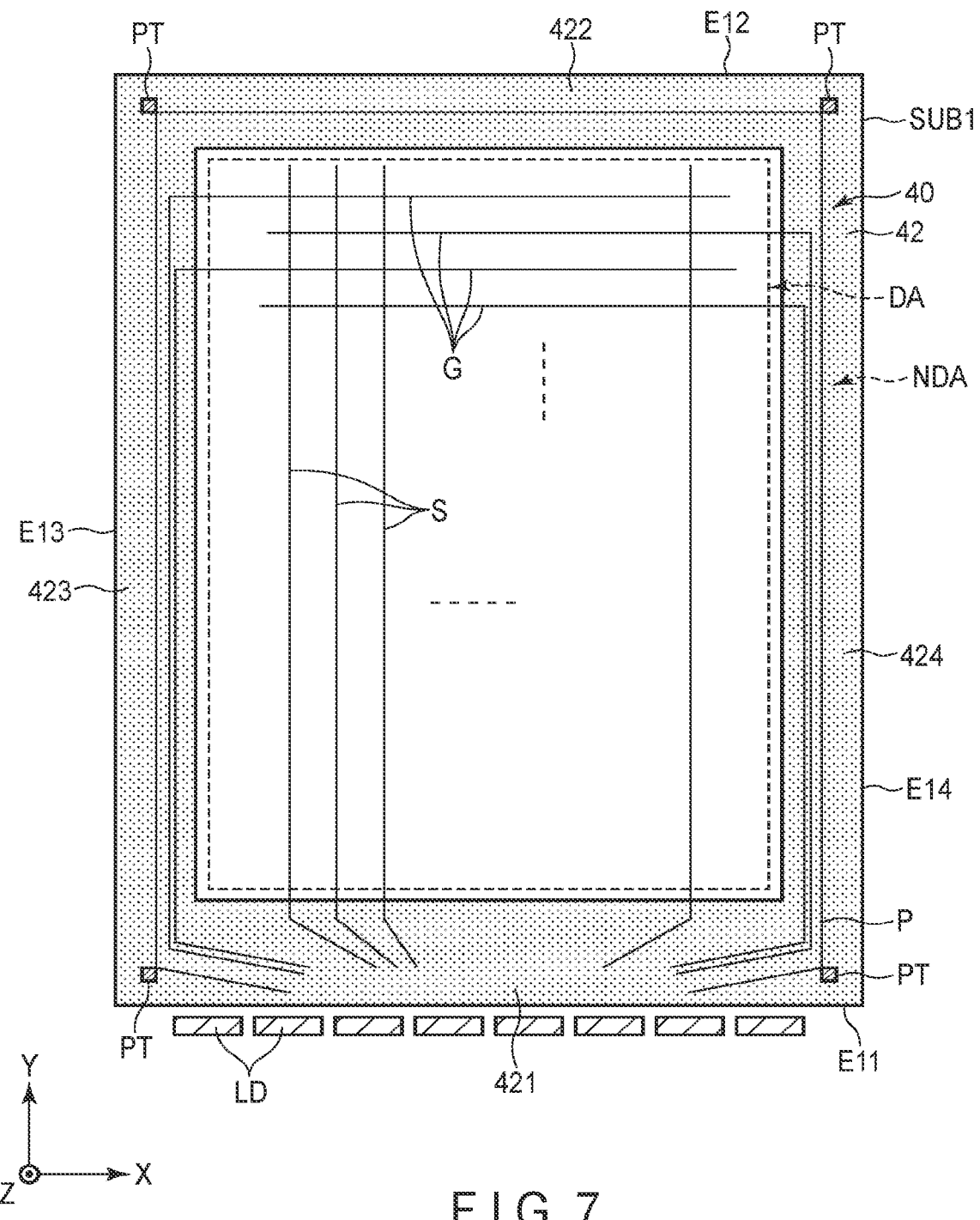
FIG. 7 is a plan view showing one configuration example of a state where a transparent layer 40 and a first substrate SUB1 overlap.

FIG. 7 is a plan view showing one configuration example of a state where the transparent layer 40 and the first substrate SUB1 are superimposed. Note that the frame portion 42 of the transparent layer 40 is illustrated but illustration of the strip portions 41 is omitted here.

The first substrate SUB1 includes a plurality of scanning lines G, a plurality of signal lines S and a power line P in the display portion DA. The scanning lines G extend along the first direction X and are disposed at intervals in the second direction Y. The signal lines S extend along the second direction Y and are disposed at intervals in the first direction X. The scanning lines G and the signal lines S are drawn to the non-display portion NDA. For example, the odd-numbered scanning lines G are drawn between the edge portion E13 and the display portion DA, and the even-numbered scanning lines G are drawn between the edge portion E14 and the display portion DA.

The power line P is a wiring line for supplying, for example, a common voltage (Vcom) and is electrically connected to the capacitance electrode 13 shown in FIG. 2. In addition, the power line P is connected to power terminals PT in corner portions of the first substrate SUB1. The power terminals PT are electrically connected to the common electrode CE of the second substrate SUB2 via a conductive material which is not shown in the drawing. The power line P and the power terminals PT are located in the non-display portion NDA, and although not described in detail, the power terminals PT are located outside the sealant SE shown in FIG. 1. The power line P may be located inside the sealant SE or overlap the sealant SE.

The scanning lines G, the signal lines S and the power line P are electrically connected to the IC chip 1 or the wiring board 2 shown in FIG. 1 between the edge portion E11 and the display portion DA.

In planar view, the third portion 423 and the fourth portion 424 of the frame portion 42 of the transparent layer 40 overlap the scanning lines G located in the non-display portion NDA. In addition, the first portion 421 overlaps the scanning lines G and the signal lines S in the non-display portion NDA. Furthermore, the frame portion 42 overlaps the power line P and the power terminals PT.

According to this configuration example, the entry of light from the light-emitting elements LD to various wiring lines located in the non-display portion NDA can be suppressed, and degradation of display quality caused by absorption in various wiring lines or undesired scattering in various wiring lines can be suppressed.

Figure 8:
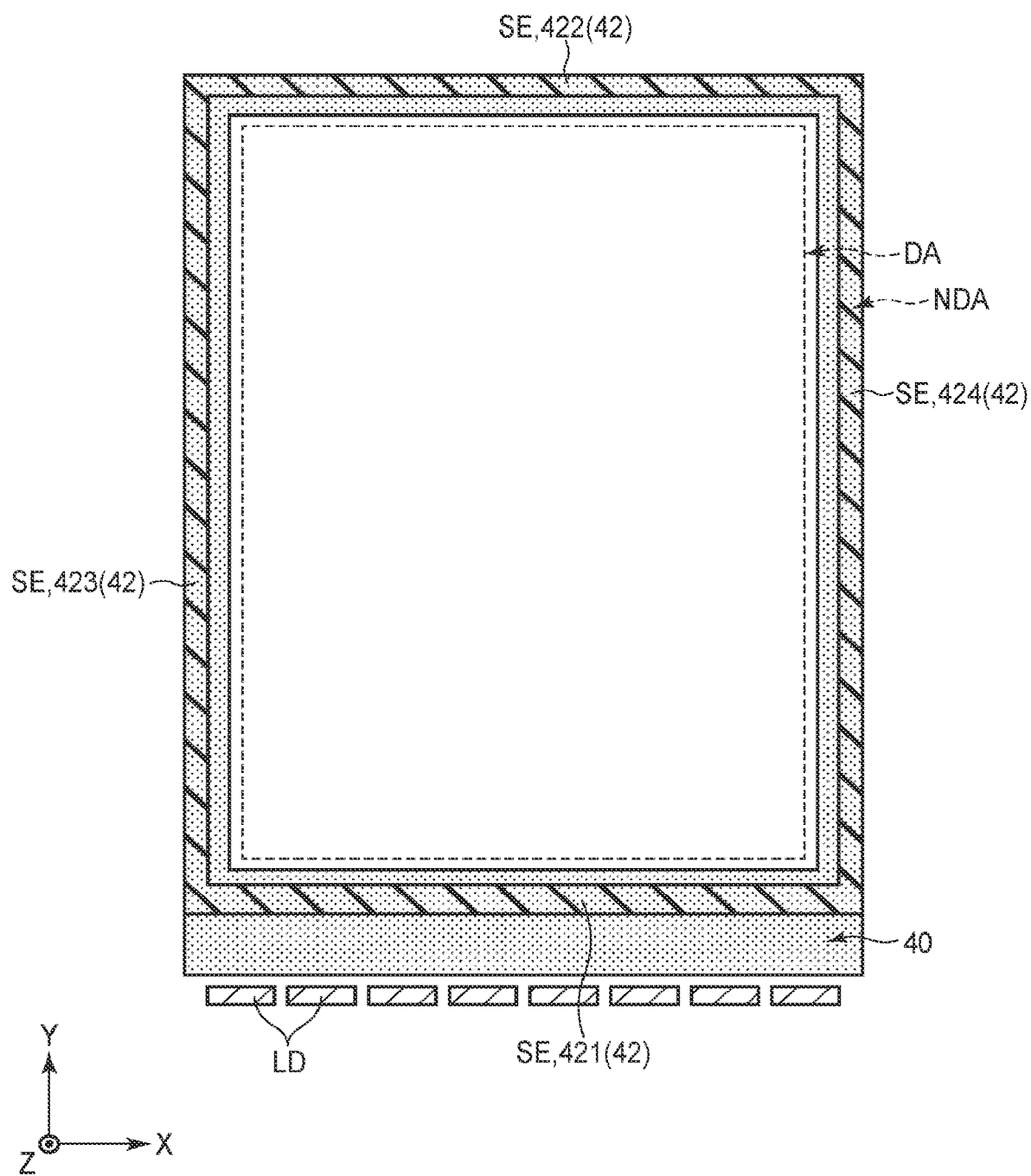
FIG. 8 is a plan view showing one configuration example of a state where the transparent layer 40 and a sealant SE overlap.

FIG. 8 is a plan view showing one configuration example of a state where the transparent layer 40 and the sealant SE are superimposed. Note that the frame portion 42 of the transparent layer 40 is illustrated but illustration of the strip portions 41 is omitted. In planar view, the frame portion 42 of the transparent layer 40 overlaps the sealant SE.

According to this configuration example, the entry of light from the light-emitting elements LD to the sealant SE located in the non-display portion NDA can be suppressed, and degradation of display quality caused by undesired scattering in the sealant SE can be suppressed.

FIG. 9 is a plan view showing another configuration example of the light-guiding element LG shown in FIG. 3. The configuration example shown in FIG. 9 is different from the configuration example shown in FIG. 4 in that the first edge 413 and the second edge 414 of the strip portion 41 is formed curved. A width W10 of the strip portion 41 gradually decreases from the first end portion 411 toward the second end portion 412. In the example shown in FIG. 9, the width W10 changes more greatly on a side close to the first end portion 411 than it does on a side close to the second end portion 412.

Also in this configuration example, similar effects to those of the configuration example shown in FIG. 4 can be obtained.

Figure 10:
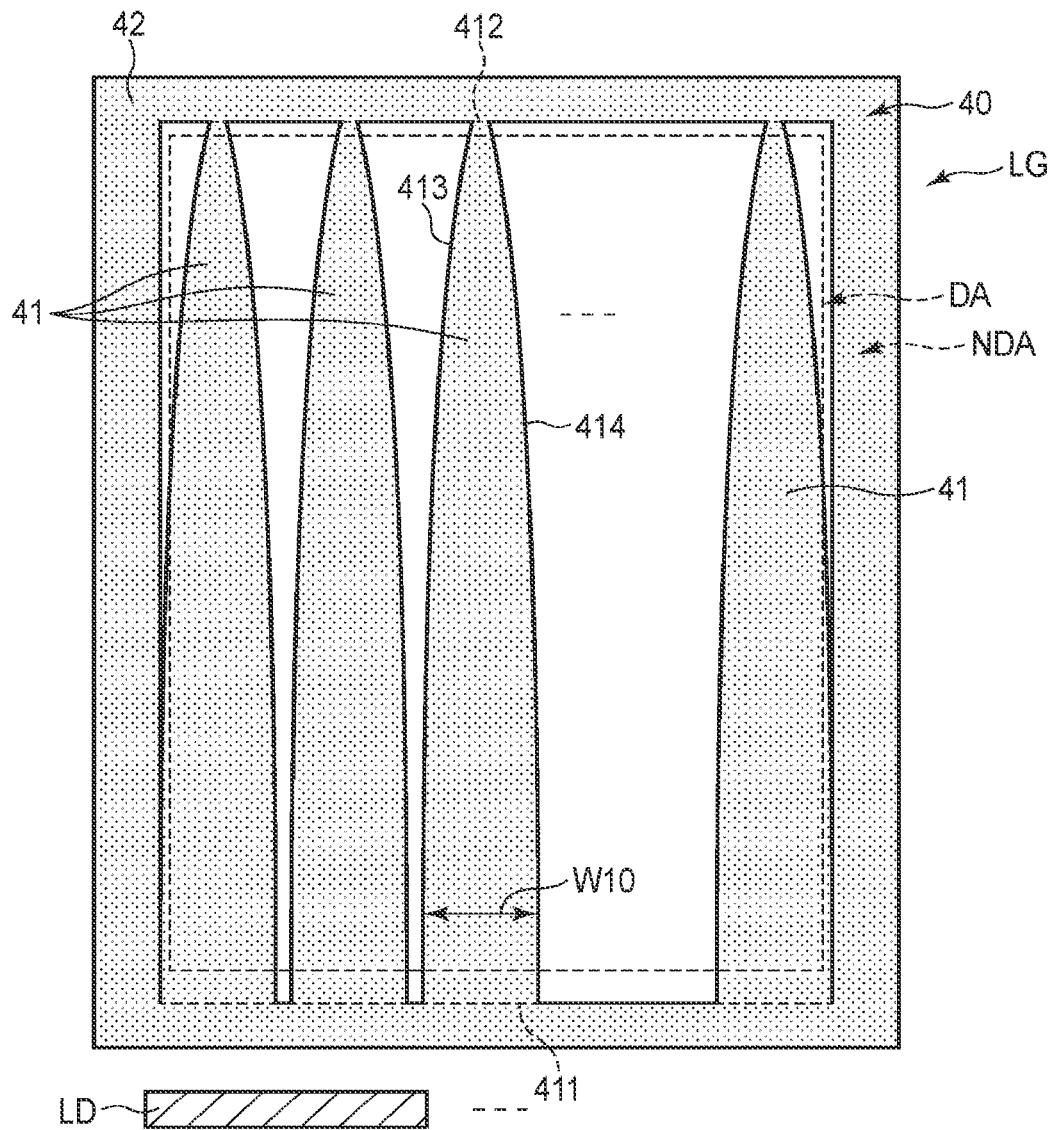
FIG. 10 is a plan view showing another configuration example of the light-guiding element LG shown in FIG. 3.

FIG. 10 is a plan view showing another configuration example of the light-guiding element LG shown in FIG. 3. The configuration example shown in FIG. 10 is different from the configuration example shown in FIG. 9 in that the width W10 of the strip portion 41 changes more greatly on the side close to the second end portion 412 than it does on the side close to the first end portion 411.

Also in this configuration example, similar effects to those of the configuration example shown in FIG. 4 can be obtained.

Figure 11:
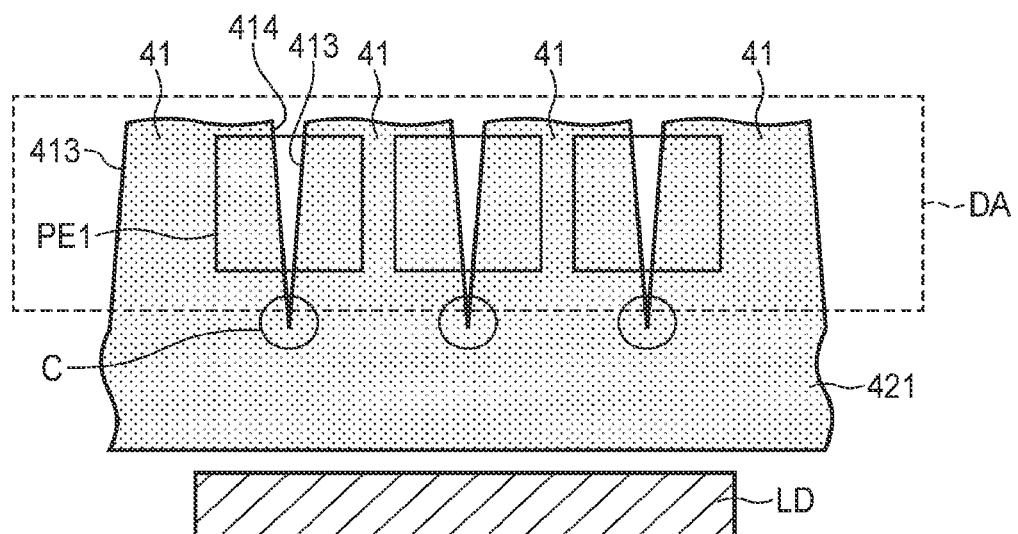
FIG. 11 is an enlarged plan view of strip portions 41 which are adjacent to one another.

FIG. 11 is an enlarged plan view of the strip portions 41 which are adjacent to one another. A connection portion C of the strip portion 41 and the first portion 421 of the frame portion 42 is formed in a V shape by connecting the first edge 413 and the second edge 414 of the adjacent strip portions 41. In this configuration example, the first portion 421 does not include the inclined surface 40S shown in FIG. 6 between the adjacent strip portions 41. Therefore, undesired scattering in the first portion 421 can be suppressed. In addition, even when the first portion 421 and the display portion DA approach, degradation of display quality caused by scattering can be suppressed.

Figure 12:
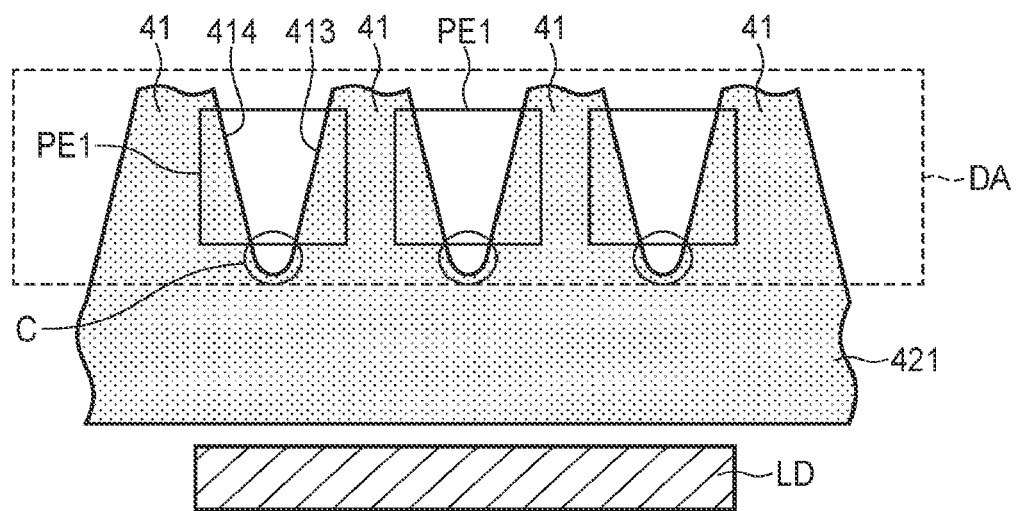
FIG. 12 is an enlarged plan view of strip portions 41 which are adjacent to one another.

FIG. 12 is an enlarged plan view of the strip portions 41 which are adjacent to one another. The configuration example shown in FIG. 12 is different from the configuration example shown in FIG. 11 in that the connection portion C is formed in a U shape. Also in this configuration example, similar effects to those of the configuration example shown in FIG. 11 can be obtained.

Figure 13:
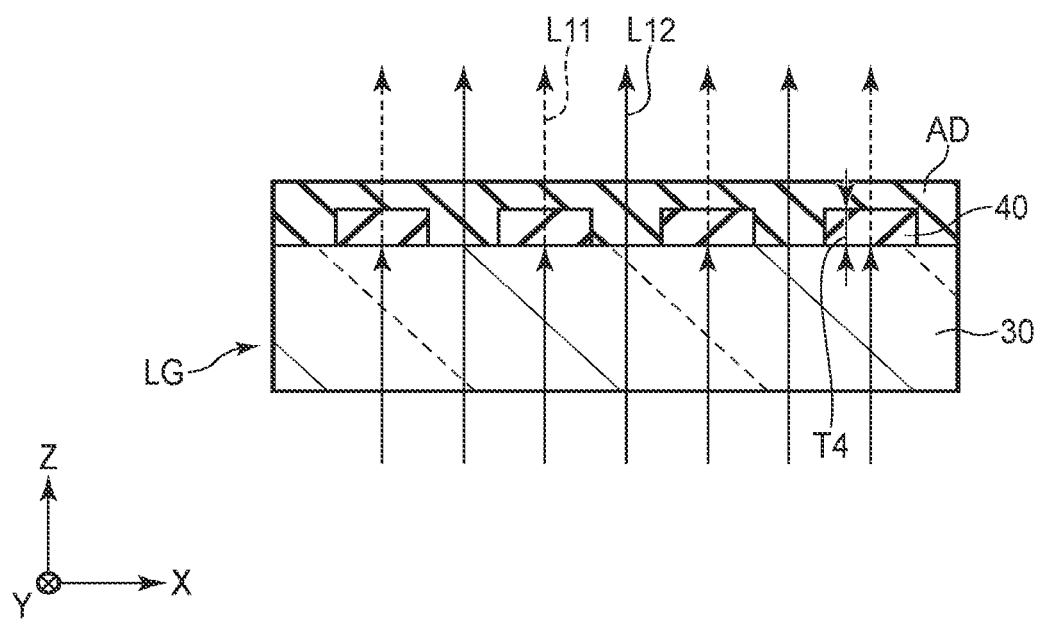
FIG. 13 is a cross-sectional view for explaining diffraction caused by the transparent layer 40.

FIG. 13 is a cross-sectional view for explaining diffraction caused by the transparent layer 40. As described above, the transparent layer 40 has a lower refractive index than the transparent substrate 30 and the transparent adhesive layer AD. Therefore, of the light transmitted through the transparent substrate 30, light L11 transmitted through the transparent layer 40 and light L12 transmitted thorough the transparent adhesive layer AD without being transmitted through the transparent layer 40 have different phases from each other. The phase difference between the light L11 and the light L12 increases as the thickness T4 of the transparent layer 40 increases. The transmitted light of the light-guiding element LG is diffracted by the phrase difference. If the phrase difference is large, a diffraction image is visually perceived, and display quality is degraded.

According to the examination by the inventor, it is confirmed that the visibility of the diffraction image can be suppressed when the thickness T4 is less than or equal to the maximum wavelength of the light transmitted through the light-guiding element LG. Therefore, the thickness T4 should preferably be less than or equal to 800 nm. Accordingly, degradation of display quality caused by the diffraction image can be suppressed.

Figure 14:
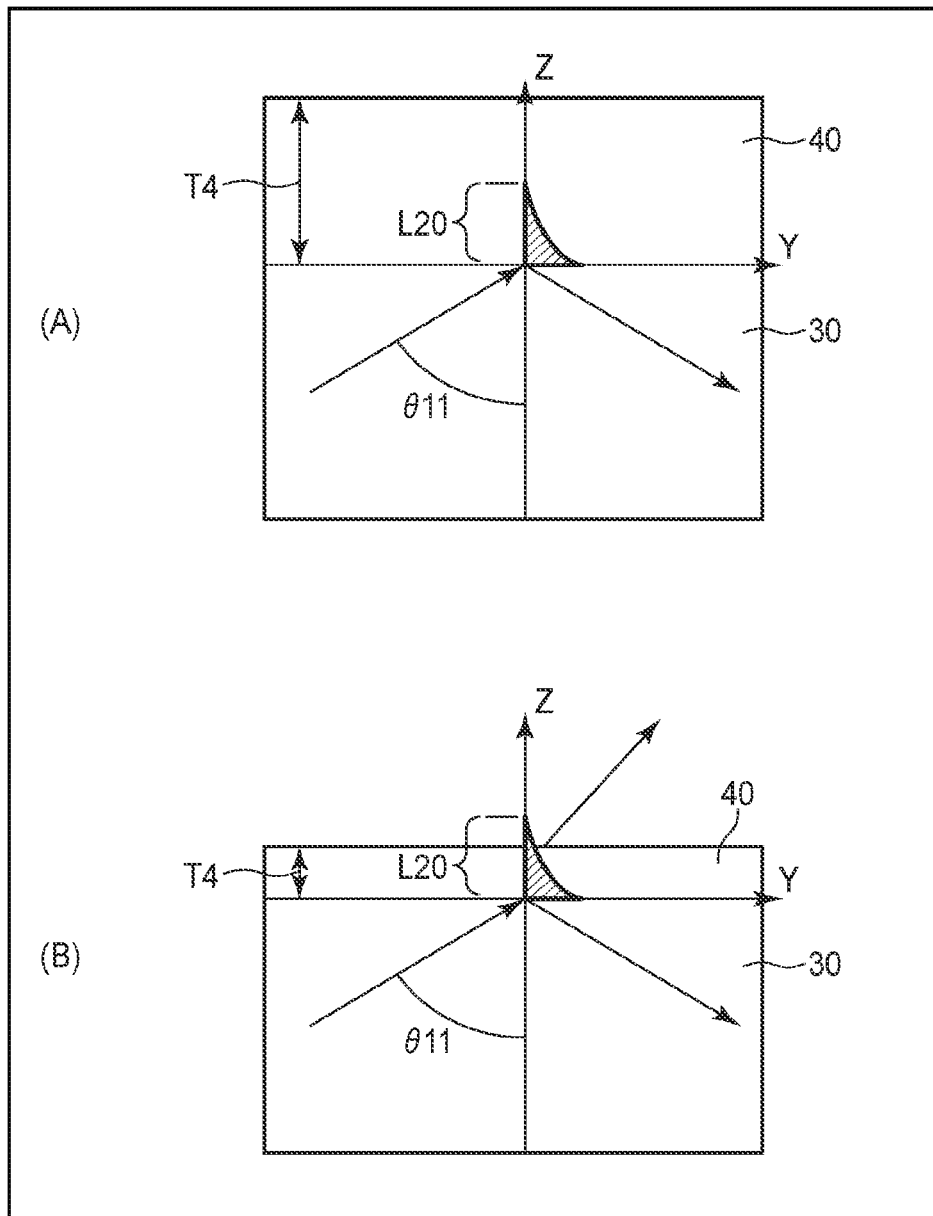
FIG. 14 is a cross-sectional view for explaining an evanescent wave.

FIG. 14 is a cross-sectional view for explaining an evanescent wave. A part of light traveling from the transparent substrate 30 toward the transparent layer 40 enters the transparent layer 40. The light wave entering the transparent layer 40 is called an evanescent wave. As shown in (A) of FIG. 14, if the thickness T4 of the transparent layer 40 is sufficiently greater than a penetration length L20 to the transparent layer 40 of the evanescent wave, the light directed to the transparent layer 40 is totally reflected. As shown in (B) of FIG. 14, if the thickness T4 of the transparent layer 40 is less than the penetration length L20, a part of the evanescent wave is transmitted through the transparent layer 40 and is lost. Consequently, the luminance of the light propagating through the transparent substrate 30 is reduced.

The penetration length L20 varies according to an incident angle θ11 at the interface between the transparent substrate 30 and the transparent layer 40. The inventor sets the lower limit of the thickness T4 to 250 nm based on the penetration length L20 with respect to the incident angle θ11, the distribution of the incident angle θ11 assumed in the light-guiding element LG of the present embodiment, the luminance distribution with respect to the divergent angle of emitted light from the light-emitting element LD, and the like.

Based on the result of the above-described examination, the thickness T4 should preferably be greater than or equal to 250 nm but less than or equal to 800 nm, and should more preferably be greater than or equal to 400 nm but less than or equal to 550 nm.

FIG. 15 is a cross-sectional view showing another configuration example of the display device DSP of the present embodiment. Note that, regarding the display panel PNL, only main parts are illustrated. The configuration example shown in FIG. 15 corresponds to an example where the transparent substrate 30 of the light-guiding element LG is bonded to the transparent substrate 20 of the second substrate SUB2 by the transparent adhesive layer AD. The transparent layer 40 including the strip portion 41 is in contact with the main surface 30A. While the transparent adhesive layer AD is in contact with substantially the entire surface of the main surface 20B, the transparent adhesive layer AD covers the transparent layer 40 and is in contact with the main surface 30A in a region in which the transparent layer 40 is missing. In the example shown in FIG. 15, the main surface 30B of the transparent substrate 30 is in contact with air. However, another transparent layer having an equal refractive index to the transparent layer 40 may be disposed on the entire surface of the main surface 30B. The configuration of the display panel PNL is as described above. The main surface 10A of the transparent substrate 10 is in contact with air, but another transparent substrate similar to the transparent substrate 30 may be bonded to the main surface 10A.

Also in this configuration example, similar effects to those of the configuration example shown in FIG. 5 can be obtained.

In the configuration example shown in FIG. 15, the transparent substrate 20 corresponds to the first transparent substrate, the main surface 20B corresponds to the first main surface, the main surface 20A corresponds to the second main surface, the transparent substrate 10 corresponds to the second transparent substrate, the main surface 10B corresponds to the third main surface, the transparent substrate 30 corresponds to the third transparent substrate, and the main surface 30A corresponds to the fourth main surface.

As described above, according to the present embodiment, a display device which can suppress degradation of display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first substrate comprising a first transparent substrate, a scanning line, a signal line crossing the scanning line, a switching element electrically connected to the scanning line and the signal line, and a pixel electrode electrically connected to the switching element;
   a second substrate comprising a second transparent substrate, and a common electrode opposed to the pixel electrode;
   a liquid crystal layer held between the first substrate and the second substrate and containing a stripe-shaped polymer and liquid crystal molecules;
   a plurality of light-emitting elements disposed in a first direction;
   a third transparent substrate comprising a main surface, and a side surface opposed to the light-emitting elements; and
   a transparent layer disposed on the main surface and having a lower refractive index than the third transparent substrate, wherein
   the third transparent substrate is bonded to the first transparent substrate or the second transparent substrate with the transparent layer sandwiched in between,
   the transparent layer comprises a plurality of strip portions disposed in the first direction, and
   the strip portions extend along a second direction orthogonal to the first direction.

2. The display device of claim 1, wherein
   the strip portions each comprise a first end portion on a side opposed to the light-emitting elements and a second end portion on an opposite side to the first end portion, and
   a first width of the first end portion is greater than a second width of the second end portion.

3. The display device of claim 2, wherein
   the strip portions each further comprise a first edge and a second edge, and
   the first edge and the second edge are each located between the first end portion and the second end portion and each extend in a different direction from the first direction and the second direction.

4. The display device of claim 2, wherein
   a third width of a gap between the first end portions adjacent to each other is less than the first width,
   a fourth width of a gap between the second end portions adjacent to each other is less than the second width, and
   the third width is less than the fourth width.

5. The display device of claim 1, wherein the pixel electrode overlaps the strip portions adjacent thereto in planar view.

6. The display device of claim 1, further comprising a display portion which displays an image and a non-display portion which surrounds the display portion, wherein
   the transparent layer further comprises a frame portion surrounding the strip portions, and
   the strip portions overlap the display portion and the frame portion overlaps the non-display portion in planar view.

7. The display device of claim 6, wherein
   the frame portion comprises a first portion and a second portion extending along the first direction, and a third portion and a fourth portion extending along the second direction,
   the first portion is connected to the first end portion, and the second portion is connected to the second end portion, and
   the third portion and the fourth portion overlap the scanning line located in the non-display portion in planar view.

8. The display device of claim 7, further comprising a sealant which bonds the first substrate and the second substrate together and seals the liquid crystal layer, wherein
   the sealant is located in the non-display portion, and
   the frame portion overlaps the sealant in planar view.

9. The display device of claim 1, wherein a thickness of the transparent layer is greater than or equal to 250 nm but less than or equal to 800 nm.

10. The display device of claim 1, wherein the transparent layer does not include an inclined surface extending along the first direction.

11. The display device of claim 1, wherein one light-emitting element of the light-emitting elements is disposed over more than one strip portion of the strip portions.

12. The display device of claim 1, further comprising a transparent adhesive layer which bonds the first transparent substrate and the third transparent substrate together, wherein
   the transparent adhesive layer has a higher refractive index than the transparent layer.

13. The display device of claim 1, further comprising a transparent adhesive layer which bonds the second transparent substrate and the third transparent substrate together, wherein the transparent adhesive layer has a higher refractive index than the transparent layer.

14. A display device comprising:
a first transparent substrate comprising a first main surface and a second main surface on an opposite side to the first main surface;
a second transparent substrate comprising a third main surface opposed to the second main surface;
a liquid crystal layer located between the second main surface and the third main surface and contains a stripe-shaped polymer and liquid crystal molecules;
a plurality of light-emitting elements disposed in a first direction;
a third transparent substrate comprising a fourth main surface opposed to the first main surface, and a side surface opposed to the light-emitting elements;
a transparent adhesive layer which bonds the first transparent substrate and the third transparent substrate together; and
a transparent layer located between the first main surface and the fourth main surface and having a lower refractive index than the third transparent substrate, wherein
the transparent layer comprises a plurality of strip portions disposed at intervals in the first direction.

15. The display device of claim 14, wherein
the transparent layer is in contact with the fourth main surface, and
the transparent adhesive layer has an equal refractive index to the third transparent substrate and is interposed between the transparent layer and the first transparent substrate.

16. The display device of claim 14, wherein
the strip portions each comprise a first end portion on a side opposed to the light-emitting elements and a second end portion on an opposite side to the first end portion, and
a first width of the first end portion is greater than a second width of the second end portion.

17. The display device of claim 16, wherein
a third width of a gap between the first end portions adjacent to each other is less than the first width,
a fourth width of a gap between the second end portions adjacent to each other is less than the second width, and
the third width is less than the fourth width.

18. The display device of claim 14, wherein
the transparent layer further comprises a frame portion surrounding the strip portions,
the frame portion comprises a first portion and a second portion extending along the first direction, and
the first portion is connected to the first end portion, and the second portion is connected to the second end portion.

19. The display device of claim 14, wherein a thickness of the transparent layer is greater than or equal to 250 nm but less than or equal to 800 nm.

20. The display device of claim 14, wherein one light-emitting element of the light-emitting elements is disposed over more than one strip portion of the strip portions.

* * * * *